United States Patent
Herdendorf et al.

(10) Patent No.: US 11,817,125 B1
(45) Date of Patent: Nov. 14, 2023

(54) CALIBRATABLE BRAKE CRAWLER FOR MULTI-DISK DRIVES

(71) Applicant: Seagate Technology LLC, Fremont, CA (US)

(72) Inventors: Brett R. Herdendorf, Mound, MN (US); Riyan Alex Mendonsa, Minneapolis, MN (US); Krishnan Subramanian, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/820,544

(22) Filed: Aug. 17, 2022

Related U.S. Application Data

(60) Provisional application No. 63/262,506, filed on Oct. 14, 2021.

(51) Int. Cl.
*G11B 5/48* (2006.01)
*G11B 5/55* (2006.01)
*G11B 21/08* (2006.01)

(52) U.S. Cl.
CPC .................... *G11B 21/08* (2013.01)

(58) Field of Classification Search
CPC ........... G11B 21/24; G11B 5/54; G11B 21/08; G11B 21/12; G11B 21/16; G11B 21/22; G11B 5/4826; G11B 5/4813; G11B 5/6005; G11B 17/038; G11B 5/4833; G11B 5/4886; G11B 5/5521; G11B 5/5573; G11B 5/484
USPC ................ 360/266.1, 266.8, 255.9
See application file for complete search history.

(56) References Cited

U.S. PATENT DOCUMENTS

| | | |
|---|---|---|
| 7,672,083 B1 | 3/2010 | Yu et al. |
| 7,988,491 B2 | 8/2011 | Davis et al. |
| 8,112,580 B2 | 2/2012 | Bandic et al. |
| 8,824,094 B1 | 9/2014 | Furlong et al. |
| 8,958,172 B1 | 2/2015 | Hansen |
| 8,958,173 B1 | 2/2015 | Hirano et al. |

(Continued)

FOREIGN PATENT DOCUMENTS

WO 2020018854 A1 1/2020

OTHER PUBLICATIONS

"Six Step Actuation Processes of the Piezo Inchworm Motor", <https://en.wikipedia.org/wiki/Inchworm_motor#/media/File:Inchworm_Motor.jpg>.

*Primary Examiner* — Nabil Z Hindi
(74) *Attorney, Agent, or Firm* — HOLZER PATEL DRENNAN

(57) ABSTRACT

A brake crawler assembly configured for vertically moving an arm assembly along a pivot member in a multi-disk hard disk drive is provided. The brake crawler assembly includes a first clamp, including a first recess within which is disposed a first actuator and a first clamp calibration element. The first clamp calibration element includes a first clamp calibration access portion adapted to be accessible externally of the first clamp and adapted to receive a first external adjustment and a first clamp internal compression modifier adapted to modify a force exerted by the first actuator on the first recess, responsive to the received first external adjustment, wherein the first clamp is configured to selectively engage the pivot member at a position along the pivot member relative to at least one disk of the multi-disk hard disk drive based on the modified force exerted.

20 Claims, 7 Drawing Sheets

(56) References Cited

U.S. PATENT DOCUMENTS

| | | | |
|---|---|---|---|
| 9,025,277 | B1 | 5/2015 | Hirano |
| 9,218,833 | B1 | 12/2015 | Shah et al. |
| 10,269,380 | B1 | 4/2019 | Sun et al. |
| 10,622,012 | B1 | 4/2020 | Tu et al. |
| 10,706,879 | B2 | 7/2020 | Garbarino |
| 10,783,912 | B1 | 9/2020 | Tu et al. |
| 10,803,891 | B1 | 10/2020 | Jacoby et al. |
| 10,811,044 | B2 | 10/2020 | Myers et al. |
| 10,839,838 | B1 | 11/2020 | Tu et al. |
| 10,930,307 | B2 | 2/2021 | Sukla et al. |
| 10,943,614 | B1 | 3/2021 | Xu et al. |
| 11,120,834 | B1 | 9/2021 | Herdendorf et al. |
| 11,176,963 | B1 | 11/2021 | Herdendorf et al. |
| 11,348,611 | B1 * | 5/2022 | Mendonsa ............. G11B 21/22 |
| 2010/0091408 | A1 | 4/2010 | Albrecht et al. |
| 2019/0333533 | A1 | 10/2019 | Mendonsa et al. |
| 2020/0027479 | A1 | 1/2020 | Myers et al. |
| 2020/0027480 | A1 | 1/2020 | Myers et al. |
| 2020/0227077 | A1 | 7/2020 | Sukla et al. |
| 2022/0068300 | A1 | 3/2022 | Herdendorf et al. |

\* cited by examiner

CALIBRATABLE BRAKE CRAWLER FOR MULTI-DISK DRIVES

CROSS-REFERENCE TO RELATED APPLICATIONS

The present application claims a benefit of priority to U.S. Provisional Patent Application no. 63/262,506, entitled "Calibratable Brake Crawler For Multi-Disk Drives" and filed on Oct. 14, 2021. This application is incorporated by reference for all that it discloses or teaches.

BACKGROUND

Large data centers require efficient and cost-effective solutions for long-term storage. Hard disk drives may require considerable precision in positioning a read/write head to operate correctly. Multi-disk solutions require more degrees of precision than a single disk solution. Providing calibration elements to allow subsequent calibration of the hard disk drive after the components of the arm assembly are assembled may provide a cost-effective way to achieve the necessary operational precision.

SUMMARY

The described technology provides a brake crawler assembly configured for moving an arm assembly along a pivot member in a multi-disk hard disk drive. The brake crawler assembly includes a first clamp, including a first recess within which is disposed a first actuator and a first clamp calibration element. The first clamp calibration element includes a first clamp calibration access portion adapted to be accessible externally of the first clamp and adapted to receive a first external adjustment and a first clamp internal compression modifier adapted to modify a force exerted by the first actuator on the first recess, responsive to the received first external adjustment, wherein the first clamp is configured to selectively engage the pivot member at a position along the pivot member relative to at least one disk of the multi-disk hard disk drive based on the modified force exerted.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
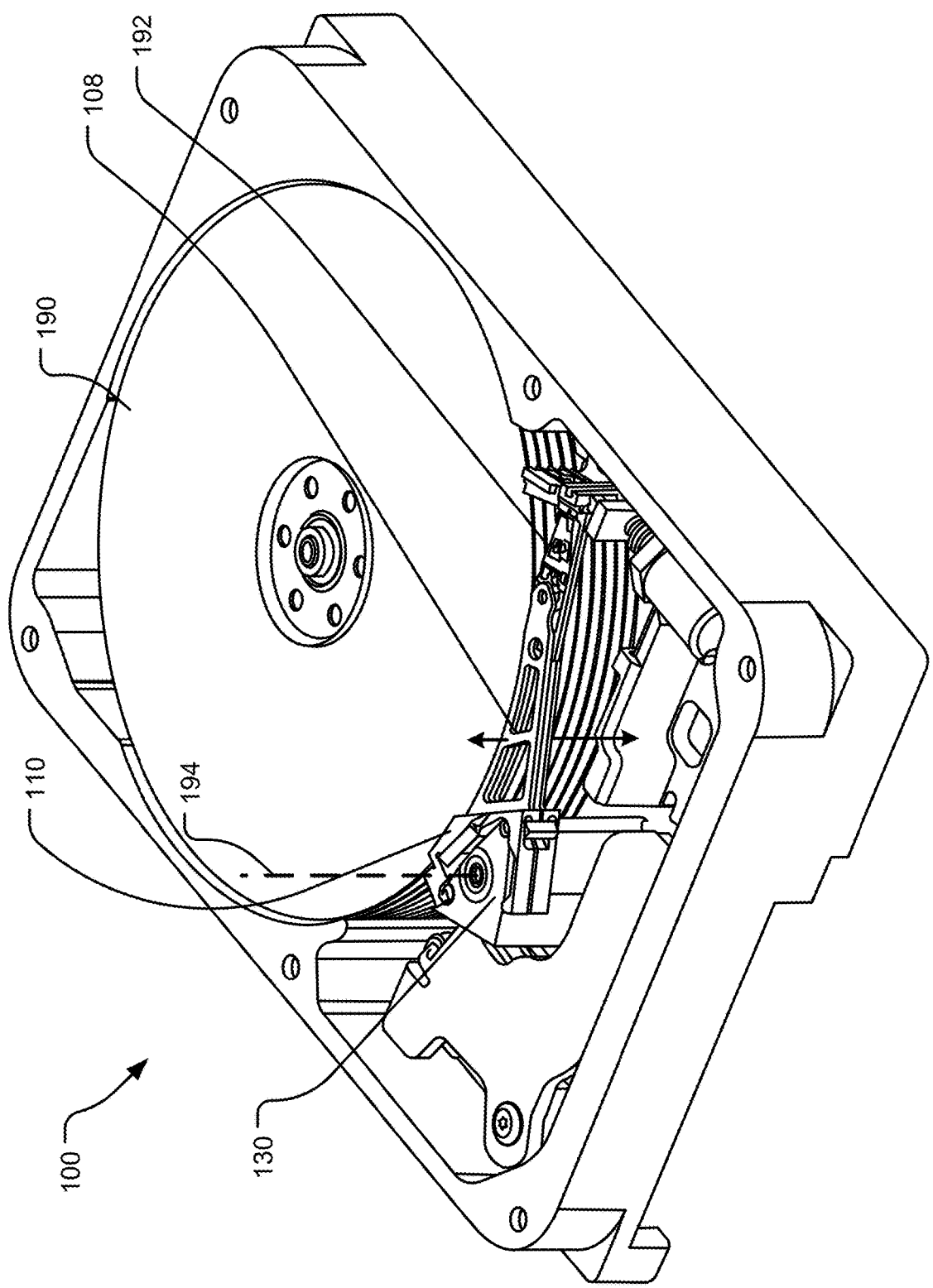
FIG. 1 illustrates an example packed multi-disk hard disk drive system.

Large data centers require efficient and cost-effective solutions for long-term storage. Hard disk drives tend to be more cost-effective than solid-state drives and typically provide sufficient retrieval speeds for data that is infrequently accessed or data applications for which latency of disk drive data retrieval is acceptable. The use of a single disk can be inefficient given the form factor and componentry required to operate the single disk. For example, a single rotatable arm assembly can be used to read any number of disks and often occupies more space than a single disk. Multi-disk hard disk drive solutions can provide a greater density of data storage in a hard disk form factor than single disk solutions. Further, the added expense for hardware to read the multiple disks may be less than having separate read-write assemblies in multiple single-disk hard disk solutions.

Hard disk drives may require considerable precision in positioning a read-write head to operate correctly. Multi-disk solutions require more degrees of precision than a single disk solution. For example, in packed or stacked disk arrays, the motion along a pivot member and the requirement that the arm assembly be positioned away from a disk in order to move to another disk within the disk pack to perform operations on a different disk can create significant issues with precision placement of the read/write head that do not apply to single disk solutions. The required precision may be on the order of nanometers in vertical and horizontal planar dimensions. Component manufacturing and assembly tolerances may be able to approach an operational precision, but the tolerances may be insufficient to satisfy the necessary operational precision. Providing externally accessible calibrating elements to facilitate subsequent calibration of the hard disk drive after the components of the arm assembly are assembled may provide a cost-effective way to achieve the necessary operational precision.

In brake crawler systems for packed or stacked multi-disk hard disk drives, actuators are used to move the arm assembly between disks. The motion may include moving in a horizontal plane to a starting position off of the disks to allow the arm assembly to move vertically and position the arm assembly on a pivot member to read from a different disk in the pack or stack. The vertical precision may be on the order of nanometers, so the vertical motion of the arm assembly may be difficult to achieve by merely assembling manufactured components. Subsequent calibration may be helpful, but the calibration systems may need external access to calibration elements that affect the internal configurations of components in the brake crawler assembly. Clamp calibration elements may include clamp calibration access portions accessible externally from the brake crawler assembly and clamp internal compression portions to apply pressure to elements within the brake crawler system. The brake crawler system may benefit from calibration elements that are accessible externally from the brake crawler assembly, as they may facilitate additional calibration after the manufacture of the individual components and/or assembly of the components. While relative motions are characterized as horizontal and vertical, it should be appreciated that movement between disks and to different positions in a disk may be in different dimensions depending on the orientation of the disk pack relative to the arm assembly.

In implementations, the clamps of brake crawlers may include actuators to selectively apply forces to portions of the clamps to cause the clamps to grip a vertical pivot member. The brake crawlers may further include vertical actuators to facilitate relative vertical movement along the pivot member between the clamps. In one implementation, the brake crawler system uses an inchworm-style motor to effectuate vertical motion along the pivot member. The clamps may alternatively clamp between vertical actuations of the vertical actuators to cause the brake crawler assembly to move vertically along the pivot member.

In an implementation, the clamp actuators are configured to expand when energy is introduced to the actuators. The clamp actuators may be situated in recesses within the clamps, and the expansion may cause the recesses to widen. This widening may cause an opening of the clamp, causing disengagement of the clamp from the pivot member. Relaxing the actuator may narrow the recess (relative to when energy is provided to the clamp actuator), causing the clamp to engage with the pivot member. This implementation reflects a bias towards clamping of the clamp. Implementations in which relaxing the clamp actuator causes the clamp to disengage from the pivot member and in which providing energy to the clamp actuator causes the camp to engage with the pivot member, representing a bias towards disengagement of the clamp, are also contemplated. Clamp calibration elements with externally accessible access portions and internal compression modifiers to modify the effect of the clamp actuators on the clamp recesses can provide a higher level of precision in clamping actuation than manufacturing and other assembly operations. The tolerances may be reflected in a calibration condition (e.g., a gripping condition) the actuation and/or clamping need to satisfy to conform to operational specifications. The calibration condition can alternatively or additionally be based on positional or motive conditions. For example, the calibration can include thresholds for one or more of the distance traveled by a clamp engagement element, the distance between clamp engagement elements, and the relative positions of one or more of the clamp engagement elements in response to modifications to energy introduced to one or more of the first actuator and/or other horizontal actuators.

The vertical actuators may be situated within split vertical recesses shared by multiple clamps at positions in which the clamps are not coupled. When energy provided to the vertical actuators is modified, the vertical actuators may modify the distance between the portions of the clamps that are not coupled to allow vertical motion of those portions relative to one another (e.g., the motion of a disengaged clamp relative to an engaged clamp). The clamps may be directly coupled at other positions, potentially creating vertical pressure the vertical actuators need to overcome to satisfy a vertical calibration condition. The vertical calibration condition may include a distance between the clamps when energy provided to the vertical actuators is modified. The vertical calibration condition may alternatively or additionally include a force calibration condition based on the force exerted by the vertical actuators on one or more of the uncoupled portions of the split vertical recess. Vertical calibration elements with externally accessible access portions and internal compression modifiers to modify the effect of the vertical actuators on the split vertical recesses can provide a higher level of precision in vertical actuation than manufacturing and other assembly operations. In implementations with more than one vertical actuator, the vertical calibration condition can include the strokes or distances of the more than one vertical actuator. For example, the stroke of the vertical actuators may be matched such that they extend the same vertical distance along the pivot member. Matching the strokes of the vertical actuators may be useful in preventing binding and preventing the system from actuating lopsided vertical motion.

The disclosed technology can provide improvements over systems without externally accessible calibration elements. By allowing for subsequent modifications to clamping forces and/or distances between clamp engagements, a simpler and less expensive manufacturing and assembly process with greater tolerances can be used. Similarly, by allowing subsequent modifications to vertical distancing forces and/or distances between clamps, simpler and less expensive manufacturing and assembly process with greater tolerances can be used. This can provide a more affordable product to be used for long-term, higher latency storage which is expected to be cheaper.

FIG. 1 illustrates an example packed multi-disk hard disk drive system 100 ("system 100"). The system 100 includes a rotatable pivot member 130 with an axis of rotation 194. The pivot member 130 is coupled to an arm assembly 108 that includes a brake crawler assembly 110 and a read/write head assembly 192. The arm assembly 108 may use the brake crawler assembly 110 to move vertically along the pivot member 130 to position the read/write head assembly 192 at an appropriate vertical position relative to a disk in a multi-disk pack 190 to allow the read/write head assembly 192 to operate on the disk. The vertical motion is illustrated with arrows. When at an appropriate vertical position, the arm assembly 108 may rotate in an arcuate fashion substantially within a horizontal plane to position the read/write head assembly 192 to operate on the disk. Operations of the read/write head assembly 192 may include reading data from the disk, erasing data from the disk, and/or writing data to the disk.

The brake crawler assembly 110 may require a high level of precision to position the arm assembly 108 at a vertical position on the pivot member 130 and allow the read/write head assembly 192 to operate correctly on a particular disk of the multi-disk pack 190. The manufacturing and/or assembly process for the brake crawler assembly 110 may be insufficiently precise to assure appropriate vertical positioning of the read/write head assembly 192 relative to a disk in the multi-disk pack 190 to satisfy specifications. The brake crawler assembly 110 may have externally accessible calibration elements (not illustrated in FIG. 1) to allow modification of the tolerances of components of the brake crawler assembly 110 to satisfy specifications, even after components of the brake crawler assembly 110 are manufactured and/or assembled. These may compensate for any deficiencies in brake crawler assembly 110 functionality resulting from the imprecision of the manufacturing and/or assembly processes.

Figure 2A:
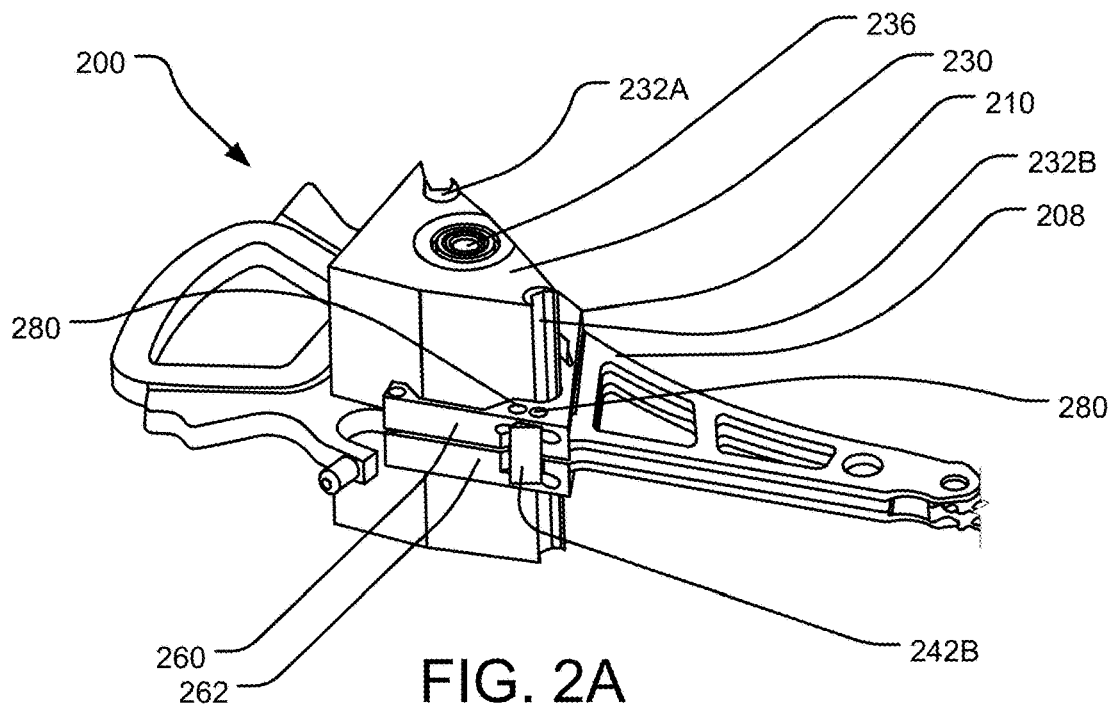
FIG. 2A illustrates a perspective view of an example brake crawler assembly system.
Figure 2B:
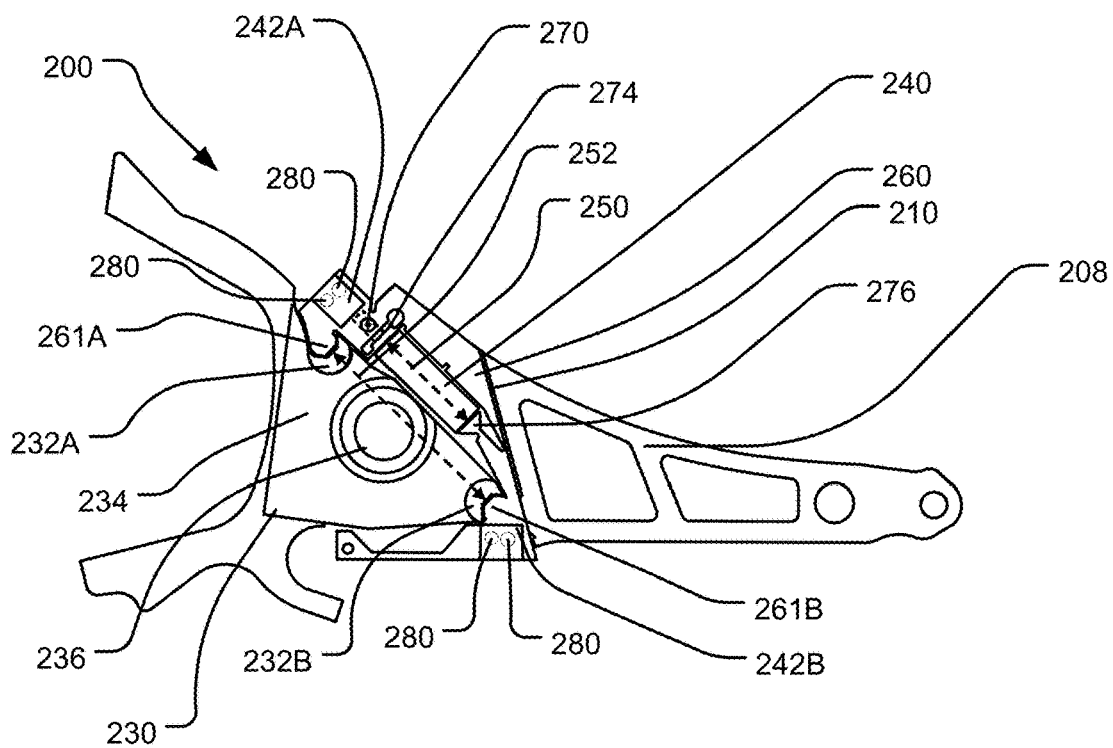
FIG. 2B illustrates a horizontal cross-section of the first clamp engaged with the pivot member of the brake crawler system.

FIGS. 2A and 2B illustrate an example brake crawler assembly system 200 ("system 200"). Specifically, FIG. 2A illustrates a perspective view of brake crawler assembly system 200. The system brake crawler assembly 200 includes a pivot member 230, a brake crawler assembly 210, and an arm assembly 208, which may be implementations of the pivot member 130, brake crawler assembly 110, and arm assembly 108, respectively. The brake crawler assembly 210 may include a first clamp 260 and a second clamp 262. FIG. 2B illustrates a horizontal cross-section of the first clamp 260 engaged with the pivot member 230 of brake crawler assembly system 200.

Each of the clamps 260, 262 may have common or similar features that may be described with respect to the first clamp 260. As illustrated in FIG. 2B, the first clamp 260 may have a first actuator 240 positioned in a first recess (illustrated as at least partially occupied by the first actuator 240A) of the first clamp 260. The first recess may be a first horizontal recess (e.g., an implementation of horizontal recess 398A). For the purposes of this specification, when the term "recess" is used, alternative or additional implementations are contemplated in which the recess is, the recess includes, or the recess can be substituted for any actuator coupler such as one or more of a housing, an attachment area, an anchoring, a connecting area, and a mating feature.

Any actuator (e.g., the first actuator 240 and/or any of the at least one vertical actuator 242A, 242B) may include one or more of a piezoelectric actuator, thermal actuator, and magnetic actuator. In implementations with the piezo actuator or thermal actuator, the actuators may be longer in a long dimension, such that expansion or contraction of the first actuator may be greater in that long dimension in response to modifying energy provided to the actuators than in dimensions in which the actuators are narrower. While illustrated as having particular shapes or a single body, the actuators may include multiple components that may or may not be directly coupled. For example, a magnetic actuator may include opposing components that are electronically coupled but do not rely on a dimensional change of the actuator elements themselves.

The first clamp 260 may include a first clamp calibration element 270 having a first clamp internal compression modifier 274 and a first clamp calibration access portion (not visible in FIGS. 2A and 2B). The first clamp internal compression modifier 274 may include a flexure that may be one or more of integral to the recess and flexible relative to other elements of the recess. The first actuator 240 may be coupled directly or indirectly to the first clamp internal compression modifier 274. Applying an external adjustment to the first clamp calibration access portion may modify a force applied by the first actuator 240 on the recess, for example, by pressing the first clamp internal compression modifier 274 against the first actuator 240. For example, the first clamp calibration element 270 may be a threaded connector (e.g., a screw) and may advance or withdraw responsive to rotation of the first clamp calibration access portion (e.g., a screw or socket head). Other examples of clamp calibration may include a wedge, a shim, a barbed pin, a stepped pin, a friction fit lock, any combination of these examples, and the like. The first clamp internal compression modifier 274 may be correspondingly advanced or withdrawn, modifying force applied on the first actuator 240 and, consequently, on the first recess. In implementations, the recess may further include a first opposing flexure 276 that is flexible relative to one or more of the first flexure and the other elements of the first clamp 260. The first actuator 240 may be coupled on at least partially opposing ends to the first clamp internal compression modifier 274 and the first opposing flexure 276. When the specification discusses modifying a force or determining whether a force satisfies a calibration condition, the force may be or an alternative to the force may include one or more of a friction and a fit. Friction can be a measurement of the friction applied by an actuator or by a clamp 260, 262 on the pivot member 230. The fit may be determined by an extent of surface engagement between elements such as between one or more of the clamps 260, 262, the actuators 240, 242A, 242B, the recesses, the internal compression modifiers 274, and the calibration elements 270, 280.

Modifying energy supplied to the first actuator 240 may cause the first actuator 240 to change a width of the recess. In the illustrated example, arrowed line 250 indicates an expansion of the first actuator 240 that widens the recess. For purposes of this specification, actuators may expand or contract (and/or may cause the recess to expand and contract) when energy is introduced and/or may contract (narrow) when relaxed (e.g., when no energy is introduced). The modification of the width of the recess may modify the engagement of the first clamp 260 with the pivot member 230. As illustrated with the second arrowed line 252, the widening of the recess may cause the first clamp 260 to disengage from the pivot member 230. This widening of the first recess may occur in a plane substantially orthogonal to an axis of rotation of the arm assembly 208. The axis of rotation may be at least partially defined by a rotation adapter 236 of the pivot member 230 that receives a member that facilitates rotation of the pivot member 230. The brake crawler assembly system 200 is illustrated as biased towards the first clamp 260 engaging with the pivot member 230, where introducing energy to the first actuator 240 causes the first clamp 260 to disengage from the pivot member 230; however, implementations are contemplated in which the brake crawler assembly system 200 is biased towards the first clamp 260 being disengaged from the pivot member 230 such that introducing energy to the first actuator 240 causes the first clamp 260 to engage the pivot member 230.

The external adjustment applied to the first clamp access portion may cause the first clamp internal compression modifier 274 to exert a modified force on the first recess based on the external adjustment. In an implementation, the modified force exerted by the first actuator 240 is calibrated to satisfy a calibration condition. In an implementation, the calibration condition is a threshold for a force applied by one or more of the first actuator 240, the first recess, and the first clamp 260. In an implementation, the first clamp 260 includes at least one clamp engagement element 261A, 261B that engages at least one pivot engagement element 232A, 232B. In this implementation, the calibration condition may additionally or alternatively include a gripping condition representative of a threshold force of engagement between the at least one clamp engagement element 261a, 261b and one or more of the pivot member 230 and the at least one pivot engagement element 232A, 232B. The pivot engagement elements 232A, 232B may have complementary elements that complementarily or conformally engage complementary or conformal portions of the clamp engagement elements 261A, 261B. For example, as illustrated, the pivot engagement elements 232A, 232B include curved recesses for receiving curved protrusions of the clamp engagement elements 261A, 261B. Other examples of complementary or conformal portions are contemplated. For example, a v-shaped recess that corresponds to a triangular protrusion or any variation thereof is contemplated. The application contemplates any complementary or conformal portions that allow for more than one opposing point (e.g., plane or line) of contact to allow for significant contact when clamped and no or little contact when not clamped. In implementations, during the process of clamping or unclamping, there is no translation motion between parts that results in wear and rubbing, which can lead to contamination (e.g., shavings of elements introduced to the hard-disk environment.

For the purposes of this specification, a number of operations can be applied to determine whether any force or distance condition (e.g., one or more of the calibration condition, gripping condition, vertical calibration condition, and the like). For determining distance between or relative positions of elements, distance measurement techniques can be used. Distance measurement techniques may include one or more of optical methods and interferometers. These distance measurement techniques can be used to measure one or more of distance between elements, positions of the elements, relative positions of the elements, and the like to see whether the distances satisfy thresholds or are within acceptable distance ranges. Forces exerted by elements can be determined using force measurement devices, such as one or more of Doppler sensors, strain gauges, and the actuators to be calibrated. By monitoring forces exerted by elements on other elements, the devices can be calibrated such that forces exerted meet a threshold force or fall within a range of acceptable forces. In an implementation, the actuators being calibrated can provide feedback regarding the force applied. For example, in an implementation in which a piezoelectric actuator is used, the pressure on the piezoelectric actuator can supply a current to a sensor that represents the force on the actuator. In an implementation, a Doppler sensor may be used and may include a laser Doppler velocimeter (LDV). Doppler measurements may be based on vibrational modes of elements that represent the extent and/or nature of forces applied by elements.

Calibration may also involve calibrating modifications to the energy provided to the actuators. For example, a controller in the hard drive may be calibrated to provide a predefined amount of energy to the actuators established during calibration. The energy calibration may need to satisfy an energy calibration condition, for example, a threshold or range of energy that is to be selectively provided by the controller. This energy provided may be controlled by an energy control module. The energy calibration condition may be an element of or alternative to the calibration condition. Computer modules can be used to automate this process. For example, a manufacturing, assembling, and/or calibration system can include calibration modules configured to interact with distance and/or force measuring hardware to determine whether the calibration conditions are met.

Calibration of the first clamp calibration element 270 may affect the manner in which and/or extent to which the recess changes width, and, hence, the manner in which and/or extent to which the first clamp 260 engages the pivot member 230. The calibration of the first clamp 260 may provide the first clamp 260 with the ability to selectively engage the pivot member 230 relative to at least one disk of the multi-disk pack of the hard disk drive, based on the modified force exerted.

In implementations, the second clamp 262, as illustrated in FIG. 2A, may be substantially similar to the first clamp 260. There may be substantial reflective symmetry between the first clamp 260 and the second clamp 262 about a plane of mirror symmetry between the first clamp 260 and the second clamp 262. Minor differences may exist, for example, with respect to the precision of the manufacturing and assembly steps associated with producing the brake crawler assembly 210. There may also be minor differences in how each of the first clamp 260 and second clamp 262 accommodates and interfaces with the at least one vertical actuator 242A, 242B (including with different structures). However, the horizontal actuators (e.g., the first actuator 240 and a second actuator not illustrated in FIGS. 2A and 2B) and the elements that are coupled to them may possess substantial reflective symmetry about a plane between the horizontal actuators.

The first clamp 260 and the second clamp 262 may include a shared coupled portion and may be otherwise uncoupled from one another. The coupled portion (not illustrated in FIGS. 2A and 2B but illustrated as coupled portion 399 in FIG. 3) may be coincident with the horizontal recesses in which the first (horizontal) actuator 240 and a second horizontal actuator (not visible in FIGS. 2A and 2B). The portions of the brake crawler assembly 210 other than the coupled portion where the first clamp 260 and second clamp 262 are coupled may rely on an actuator to determine vertical distances between the first clamp 260 and the second clamp 262. The at least one vertical actuator 242A, 242B may each be coupled to both of the first clamp 260 and the second clamp 262. For example, the first clamp 260 and the second clamp 262 may share split vertical recesses with portions in each of the first clamp 260 and the second clamp 262. These split vertical recesses may be positioned in portions of the brake crawler assembly 210, where the first clamp 260 and the second clamp 262 are otherwise uncoupled. In implementations where the at least one vertical actuator 242A, 242B are single units that expand and contract responsive to modification of introduced energy, the at least one vertical actuator 242A, 242B may couple the first clamp 260 and the second clamp 262 at portions where the first clamp 260 and the second clamp 262 are otherwise uncoupled.

The at least one vertical actuator 242A, 242B may couple otherwise uncoupled portions of the first clamp 260 and the second clamp 262. Although illustrated as two vertical actuators, the at least one vertical actuator 242A, 242B may include one or any other number of vertical actuators. The at least one vertical actuator 242A, 242B may be used to modify a distance between and/or force between the first clamp 260 and the second clamp 262 at positions at which the at least one vertical actuator 242A, 242B are coupled to the first clamp 260 and the second clamp 262. Each of the at least one vertical actuator 242A, 242B may be positioned in a split vertical recess, the split vertical recess having a first recessed portion in the first clamp 260 and the split vertical recess having a second recessed portion in the second clamp 262. The split may represent a separation between the first clamp 260 and the second clamp 262 where they are not otherwise directly coupled.

Each of the at least one vertical actuator 242A, 242B may have vertical calibration elements 280. The vertical calibration elements 280 may each include a vertical calibration element access portion and an internal distance modifier. The at least one vertical actuator 242A, 242B applies force to the split vertical recesses responsive to modification of energy introduced to the at least one vertical actuator 242A, 242B, causing a modification of the distance between the first clamp 260 and the second clamp 262 at portions of the brake crawler assembly 210 in which the first clamp 260 and the second clamp 262 are otherwise uncoupled (otherwise meaning other than any coupling established by the at least one vertical actuator 242A, 242B, if any, between the first clamp 260 and the second clamp 262).

The vertical calibration element access portion may be an element of the vertical calibration element 280 that is accessible from outside of the brake crawler assembly 210. Modification of the vertical calibration element access portion may cause an internal distance modifier to modify one or more of a force applied by the at least one vertical actuator 242A,242B on the split vertical recess and/or to modify a vertical distance between the first clamp 260 and second clamp 262 when modifying energy provided to the at least one vertical actuator 242A, 242B. The vertical calibration element access portion may receive an external adjustment to satisfy a calibration condition, such as a vertical calibration condition. The vertical calibration condition may include a distance between and/or a position of one or more of the first clamp 260, the second clamp 262, the at least one vertical actuator 242A, 242B, positions in the recess, and an internal distance modifier. In an implementation, the vertical calibration condition may additionally or alternatively include a force calibration condition based on the force exerted by the at least one vertical actuator 242A, 242B on one or more of the at least a portion of the first clamp 260 and the at least a portion of the second clamp 262. The condition may include a force and/or distance threshold or range as appropriate. One or more of the distance and the force may be modified by the external adjustment to satisfy a vertical calibration condition. In an implementation, the vertical calibration condition includes a resting distance range between the first clamp 260 and the second clamp 262 when the at least one vertical actuator 242A, 242B is at rest and includes an energized distance range between at least a portion of the first clamp 260 and at least a portion of the second clamp 262 when the at least one vertical actuator 242A, 242B is provided a predefined quantity of energy.

In implementations, the internal distance modifier may be a flexure on which other elements of the vertical calibration element exert a force. At least a portion of the internal distance modifier may be coupled to the at least one vertical actuator 242A, 242B. In implementations, another different portion of the at least one vertical actuator 242A, 242B that at least partially opposes the internal distance modifier may be coupled to a portion of the split vertical recess. The internal distance modifier may be integral to and flexible relative to other portions of the split vertical recess.

In implementations, the one or more of the at least one vertical actuator 242A, 242B and the first actuator 240 (and other horizontal actuators) when installed, may block access to the other of them, the calibration of each may be conducted in an order such that introduction of an actuator does not prevent calibration of a different actuator. For example, if the at least one vertical actuator 242A, 242B blocks access to the first clamp calibration access portion when the at least one vertical actuator 242A, 242B is installed, the first actuator 240 may be installed and calibrated before the at least one vertical actuator 242A, 242B is introduced to the brake crawler assembly 210.

Figure 3A:
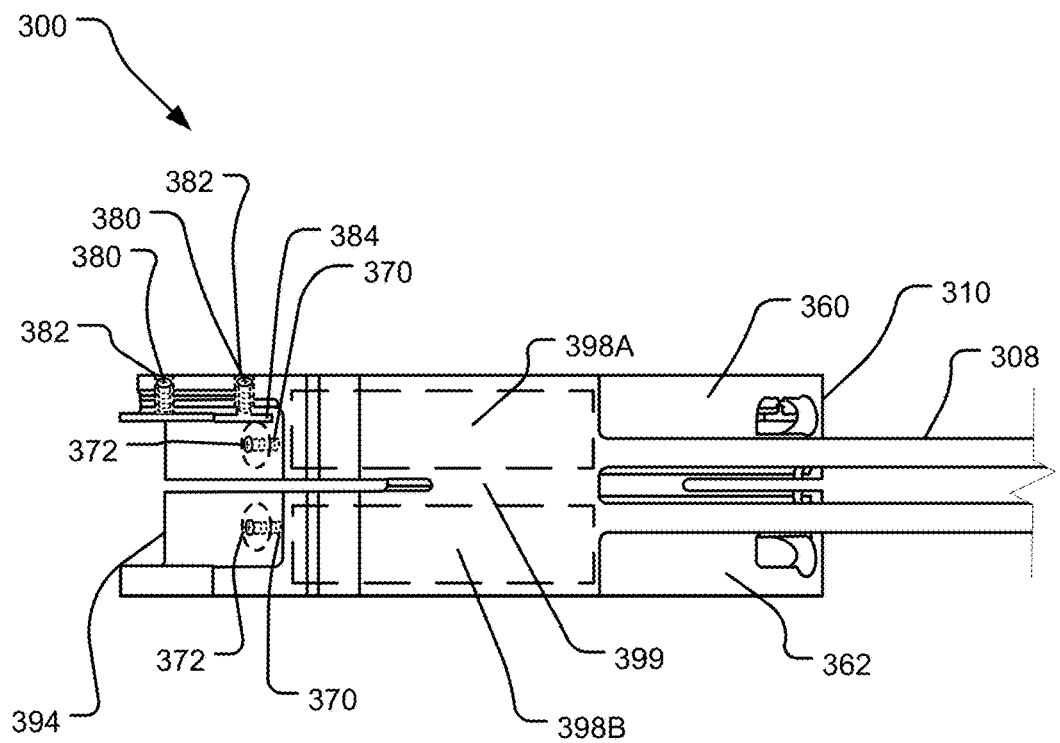
FIG. 3A illustrates a first side view of another example brake crawler assembly system.
Figure 3B:
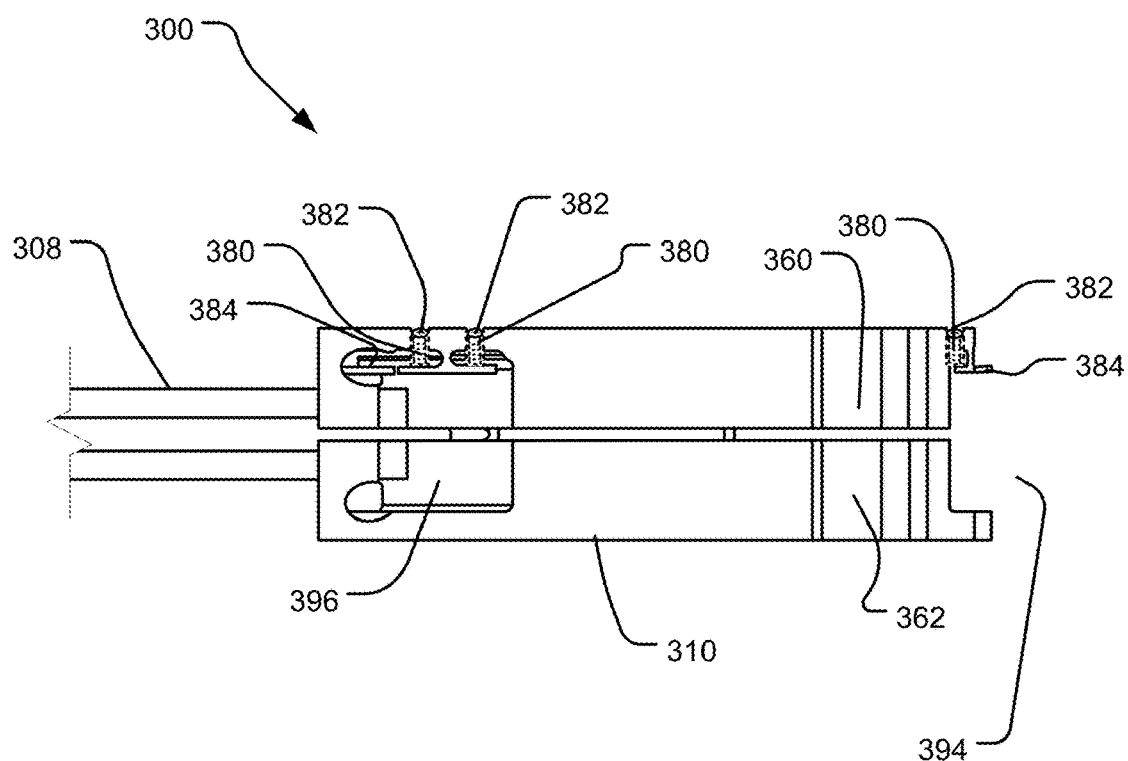
FIG. 3B illustrates a second side view of the another example brake crawler assembly system.

FIGS. 3A and 3B illustrate another example brake crawler assembly system 300 ("system 300"). Specifically, FIG. 3A illustrates a first side view of the another example brake crawler assembly system 300. FIG. 3B illustrates a second side view of the another example brake crawler assembly system 300. The second side view may be a substantially opposite view of the first side view.

The assembly 308, brake crawler assembly 310, first clamp 360, second clamp 362, clamp calibration element 370s, and vertical calibration elements 380 may be implementations of the arm assembly 208, brake crawler assembly 210, first clamp 260, second clamp 262, first clamp calibration element 270, and vertical calibration elements 280, respectively.

The brake crawler assembly 310 may have a first horizontal recess 398A and a second horizontal recess 398B (illustrated using dashed lines, as they are located on the reverse side of the illustration). The horizontal recesses 398A, 398B may be substantially horizontally coincident at different vertical positions within the brake crawler assembly 310. The horizontal recesses 398A, 398B may be located in a coupled portion 399 of the brake crawler assembly 310 at which the first clamp 360 is directly coupled to the second clamp 362. Each of the horizontal recesses 398A, 398B may be adapted to receive a first and second actuator, respectively. While illustrated as each clamp 360, 362 having a single horizontal actuator, each clamp 360, 362 may have any number of horizontal actuators. The horizontal recesses 398A, 398B may have clamp calibration elements 370, including clamp internal compression modifiers (not visible in FIGS. 3A and 3B) and clamp calibration access portions 372. When coupled to the interior of the horizontal recesses 398A, 398B, the force the horizontal actuators exert against the recesses and/or the clamp internal compression modifiers and/or the distance between these elements can be adjusted with an external adjustment to the clamp calibration access portions 372 (as described with respect to implementations of FIGS. 2A and 2B).

The brake crawler assembly 310 may have split vertical recesses 394, 396. At least one vertical actuator may be placed in the split vertical recesses 394, 396. The at least one vertical actuator may apply forces to the split vertical recesses 394, 396 to modify the distance between the first clamp 360 and the second clamp 362 at positions where the first clamp 360 is not vertically coupled with the second clamp 362. In implementations, these uncoupled portions may be positioned at different horizontal positions surrounding the coupled portion 399. When the energy provided the at least one vertical actuator is modified, the height (vertical distance) of the split vertical recesses 394, 396 may be correspondingly modified. This may modify the vertical distance between the first clamp 360 and the second clamp 362 when one of the first clamp 360 and the second clamp 362 is engaged with the pivot member, and the other is not engaged with the pivot member. In the illustrated implementation, there are two split vertical recesses 394, 396, each at positions at which the first clamp 360 is not coupled with the second clamp 362, and they surround, in a horizontal dimension, the horizontal recesses 398A, 398B that are in the coupled portion 399.

The split vertical recesses 394, 396 may have vertical calibration elements 380, including internal distance modifiers 384 and vertical calibration element access portions 382. When coupled to the interior of the split vertical recesses 394, 396, the force the at least one vertical actuator exerts against the split vertical recesses 394, 396 and/or the internal distance modifiers 384 and/or the distance between these elements can be adjusted with an external adjustment to the vertical calibration element access portions 382 (as described with respect to implementations of FIGS. 2A and 2B).

Figure 4B:
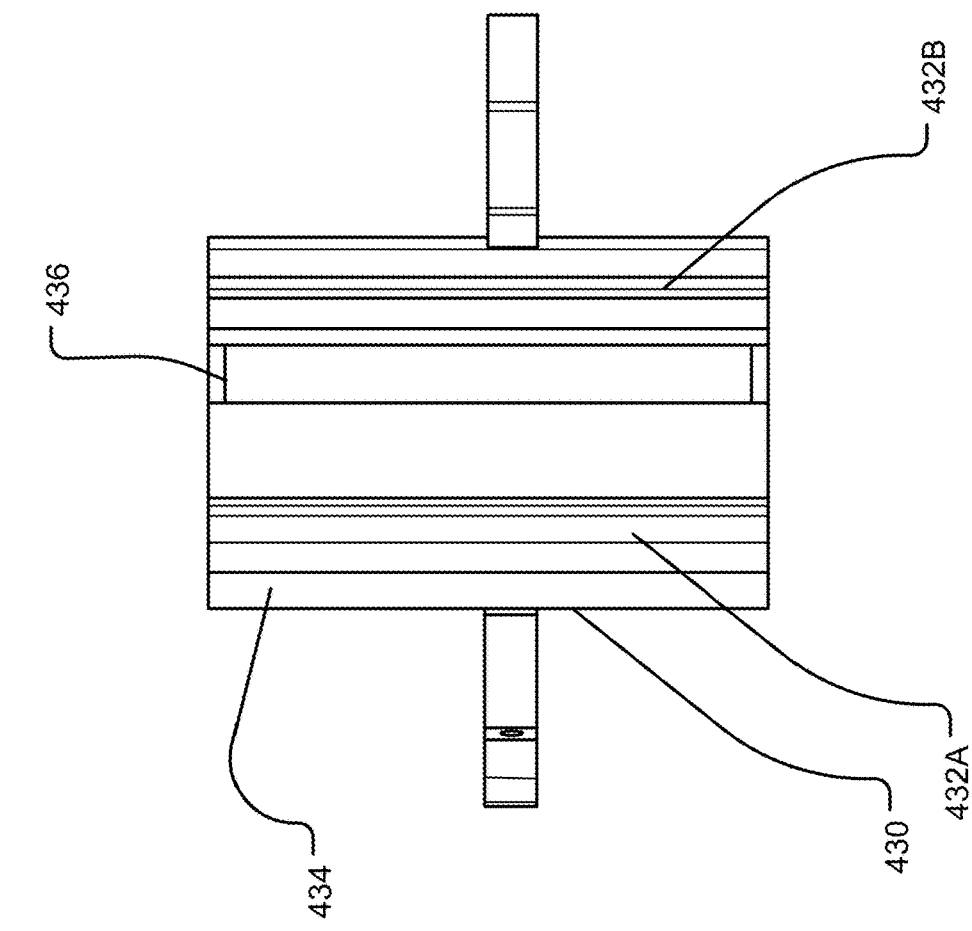
FIG. 4B illustrates a side view of the example pivot member system.
Figure 4A:
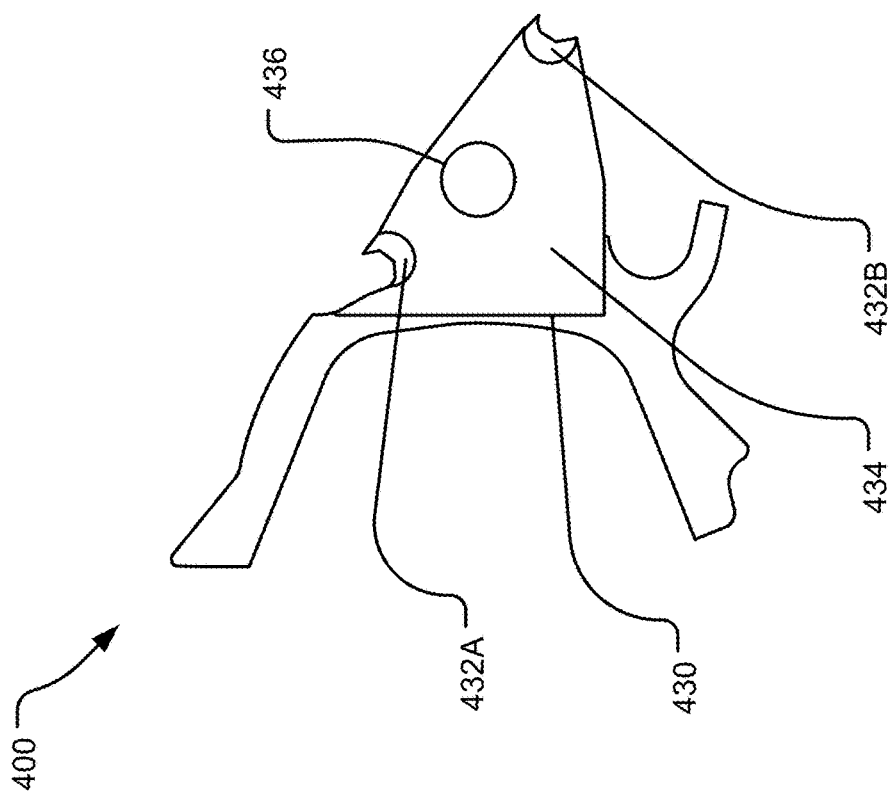
FIG. 4A illustrates a top view of an example pivot member system.

FIGS. 4A and 4B illustrate an example pivot member system 400 ("system 400"). Specifically, FIG. 4A illustrates a top view of an example pivot member system 400, and FIG. 4B illustrates a side view of an example pivot member system 400. The pivot member system 400 includes a pivot member 430. Pivot member 430 may be an implementation of pivot member 230. The pivot member 430 may include pivot engagement elements 432A, 432B adapted to engage with clamp engagement elements of clamps. The pivot engagement elements 432A, 432B. The pivot engagement elements 432A, 432B may have complementary elements that complementarily or conformally engage complementary or conformal portions of the clamp engagement elements. For example, as illustrated, the pivot engagement elements 432A, 432B include curved recesses for receiving curved protrusions of the clamp engagement elements. Alternative, complementary elements are contemplated. For instance, an implementation is contemplated in which the pivot engagement elements 432A, 432B are substantially cylindrical and adapted to conform to curved recesses of clamp engagement elements.

Other examples of complementary or conformal portions are contemplated. For example, a v-shaped recess that corresponds to a triangular protrusion or any variation thereof is contemplated. The application contemplates any complementary or conformal portions that allow for more than one opposing point (e.g., plane or line) of contact to allow for significant contact when clamped and no or little contact when not clamped. In implementations, during the process of clamping or unclamping, there is no translation motion between parts that results in wear and rubbing, which can lead to contamination (e.g., shavings of elements introduced to the hard-disk environment.

In implementations, the pivot engagement elements 432A, 432B are composed of materials different from the materials of which the pivot member body 434 is composed. For example, the pivot engagement elements 432A, 432B may be composed at least partially of a material that is one or more of heavier, stronger, harder, less malleable, more fracture tough, and stiffer than any material in the pivot member body 434. The pivot member body 434 may have to move vertically quickly, but it may also receive stress and/or strain from clamping of the brake crawler assembly. Making the pivot engagement elements 432A, 432B sturdier may make them less likely to degrade or deform in response to clamping. This sturdiness may come at the expense of increased weight which makes it more difficult to facilitate precision movement at a quick speed. Thus, making the pivot member body 434 of a lighter and potentially less sturdy material can provide a lighter overall pivot member 430 that can move quickly and smoothly. The pivot member 430 may also have a rotation adapter 436 that can interact with a rotating member to facilitate rotation of the pivot member 430. Alternative or additional features can be used to increase the strength of the pivot member 430 while reducing the weight of the pivot member 430. For example, stronger materials can be uniformly used, but with the pivot member 430 having a non-uniform distribution, such as by using one or more of hollow portions, lattice structures, and holes.

Figure 5:
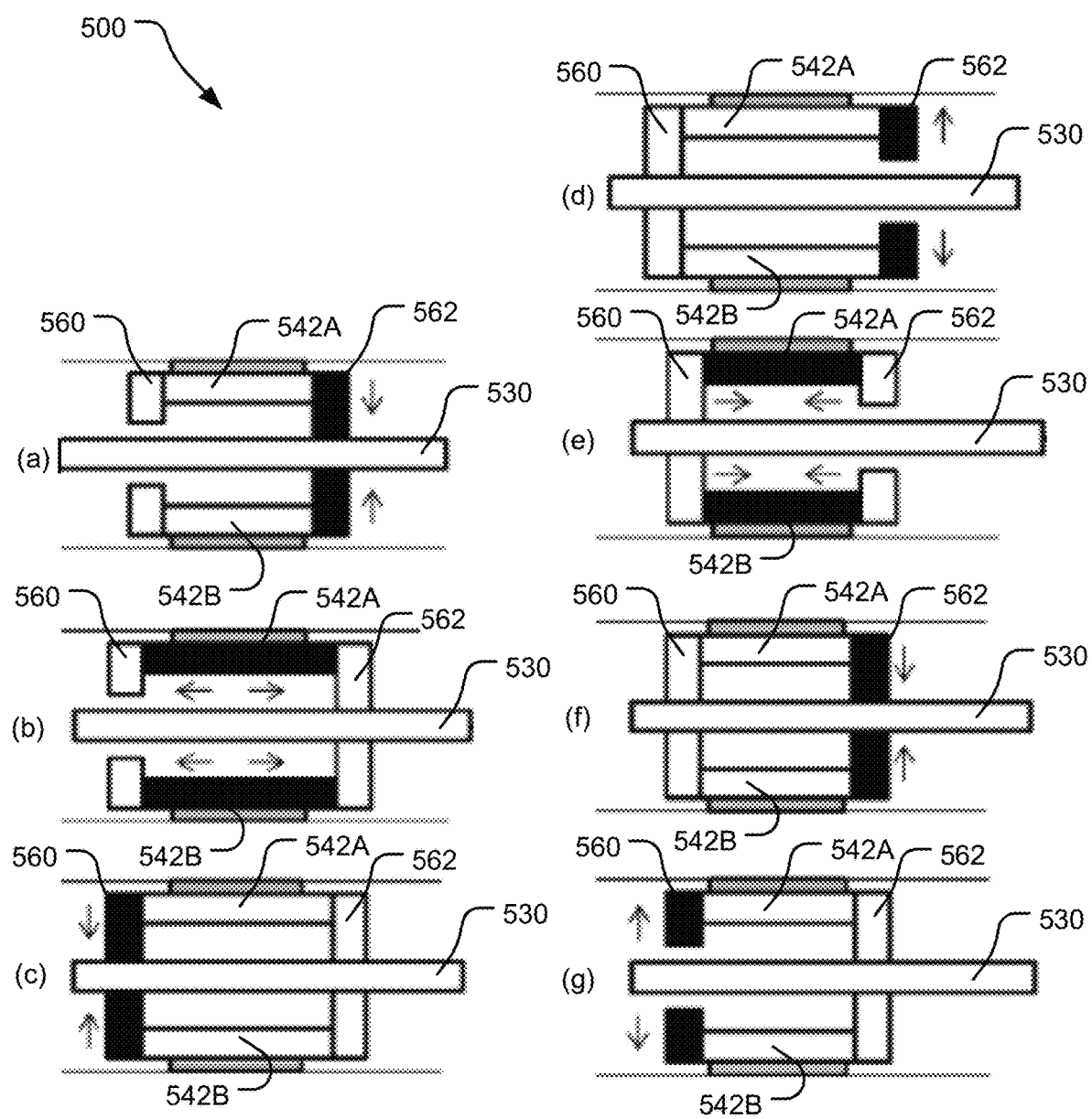
FIG. 5 illustrates a simplified example progression of an inchworm motor motion of a brake crawler assembly.

FIG. 5 illustrates a simplified example progression 500 of an inchworm motor motion of a brake crawler assembly. The progression 500 is illustrated using a simplified illustration of a first clamp 560, a second clamp 562, vertical actuators 542A, 542B, and a pivot member 530, which may be implementations of the first clamp 260, second clamp 262, vertical actuators 242A, 242B, and pivot member 230, respectively. To clarify, the elements that are illustrated in other FIGs. as vertically oriented (e.g., pivot member 530 and vertical actuators 542A, 542B) and horizontally oriented (e.g., the first clamp 560 and second clamp 562) are presented here as reversed. Bold elements represent elements that change in an operation, and arrows indicate the directions of the changes. The operations (a)-(g) of progression 500 may be conducted by a locomotion module stored in the hard disk, such as in native drivers. In operation (a), the second clamp 562 engages with (e.g., clamps on) the pivot member 530. In operation (b), while the second clamp 562 is still engaged with the pivot member 530, the vertical actuators 542A, 542B expand. This expansion advances the first clamp 560 relative to the second clamp 562 along the pivot member 530. In operation (c), the first clamp 560 clamps on the pivot member 530. In operation (d), the second clamp 562 disengages from the pivot member 530 while the vertical actuators 542A, 542B remain expanded. In operation (e), the vertical actuators 542A, 542B contract and pull the second clamp 562 towards the first clamp 560. In operation (f), the second clamp 562 engages with the pivot member 530 while the vertical actuators 542A, 542B are still contracted. In operation (g), the first clamp 560 disengages from the pivot member 530. The progression 500 may continue from here at operation (b).

Figure 6:
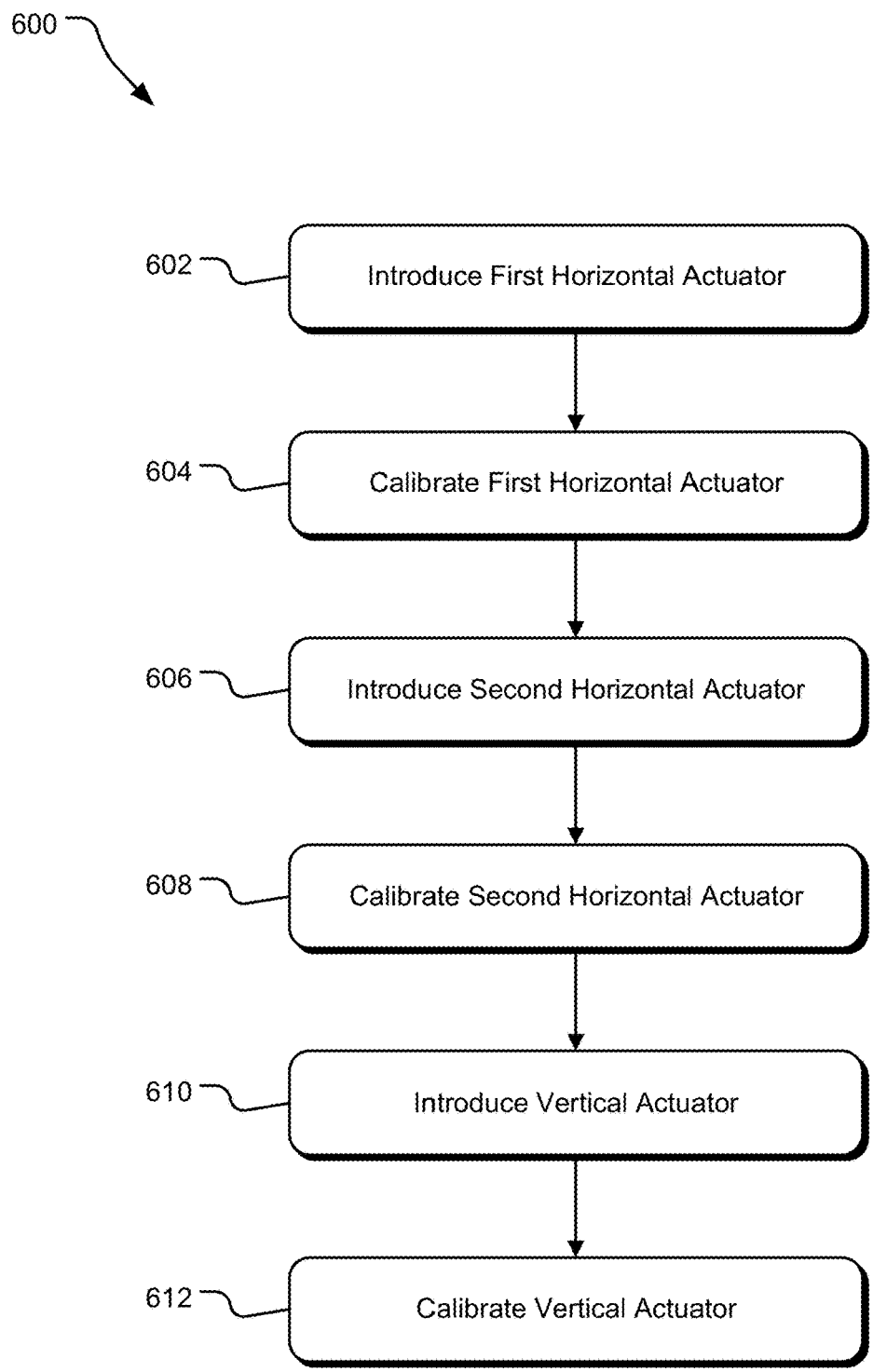
FIG. 6 illustrates example operations of calibrating a brake crawler assembly.

FIG. 6 illustrates example operations 600 of calibrating a brake crawler assembly. Introducing operation 602 introduces a first horizontal actuator to a recess of a first clamp. The first clamp may include a first clamp calibration element having a first clamp internal compression modifier and a first clamp calibration access portion. The first clamp internal compression modifier may include a flexure that may be one or more of integral to the recess and flexible relative to other elements of the recess. The first actuator may be coupled directly or indirectly to the first clamp internal compression modifier.

Calibration operation 604 calibrates the first horizontal actuator. Applying an external adjustment to the first clamp calibration access portion may modify a force applied by the first actuator on the recess, for example, by pressing the first clamp internal compression modifier against the first actuator. For example, the first clamp calibration element may be a threaded connector (e.g., a screw) and may advance or withdraw responsive to rotation of the first clamp calibration access portion (e.g., a screw head). The first clamp internal compression modifier may be correspondingly advanced or withdrawn, modifying force applied on the first actuator, and, consequently, on the first recess. In implementations, the recess may further include a first opposing flexure that is flexible relative to one or more of the first flexure and the other elements of the first clamp. The first actuator may be coupled on at least partially opposing ends to the first clamp internal compression modifier and the first opposing flexure.

Modifying energy supplied to the first actuator may cause the first actuator to change the width of the recess and cause the first clamp to engage with or disengage from the pivot member. The external adjustment applied to the first clamp access portion may cause the first clamp internal compression modifier to exert a modified force on the first recess based on the external adjustment. In an implementation, the modified force exerted by the first actuator is calibrated to satisfy a calibration condition. In an implementation, the calibration condition is a threshold for a force applied by one or more of the first actuator, the first recess, and the first clamp. In an implementation, the first clamp includes at least one clamp engagement element that engages at least one pivot engagement element. In this implementation, the calibration condition may additionally or alternatively include a gripping condition representative of a threshold force of engagement between the at least one clamp engagement element and one or more of the pivot member and the at least one pivot engagement element. The pivot engagement elements may have complementary elements that complementarily or conformally engage complementary or conformal portions of the clamp engagement elements. For example, the pivot engagement elements can include curved recesses for receiving curved protrusions of the clamp engagement.

Calibration operation 604 may involve further engaging and/or disengaging the clamp. For example, the force or distance may be calibrated one or more of when the first clamp is engaged and the first clamp is disengaged. Depending on a bias of the clamping motion relative to energy being modified to the first clamp, modification of energy provided to the first actuator can cause the actuator to widen or narrow the recess to which the first actuator was introduced.

For the purposes of this specification, a number of operations can be applied to determine whether any force or distance condition (e.g., one or more of the calibration condition, gripping condition, vertical calibration condition, and the like) is satisfied. For determining a distance between or relative positions of elements, distance measurement techniques can be used. Distance measurement techniques may include one or more of optical methods and interferometers. These distance measurement techniques can be used to measure one or more of distance between elements, positions of the elements, relative positions of the elements, and the like to see whether the distances satisfy thresholds or are within acceptable distance ranges. Forces exerted by elements can be determined using force measurement devices, such as one or more of Doppler sensors and strain gauges. By monitoring forces exerted by elements on other elements, the devices can be calibrated such that forces exerted meet a threshold force or fall within a range of acceptable forces. In an implementation, a Doppler sensor may include a laser Doppler velocimeter (LDV). Doppler measurements may be based on vibrational modes of elements that represent the extent and/or nature of forces applied by elements. Computer modules can be used to automate this process. For example, a manufacturing, assembling, and/or calibration system can include calibration modules configured to interact with distance and/or force measuring hardware to determine whether the calibration conditions are met. A distance or force calibration condition can be applied to one or more of the conformations of operations (a)-(g) represented in progression 500. In an implementation, the actuators themselves may be used to determine any forces applied. For example, in implementations where the actuators are piezoelectric actuators, a signal may be received from the piezoelectric actuators that represents the extent of force applied. This signal can be used to determine whether the actuators satisfy a calibration condition.

Calibration may also involve calibrating modifications to the energy provided to the actuators. For example, a controller in the hard drive may be calibrated to provide a predefined amount of energy to the actuators established during calibration. The energy calibration may need to satisfy an energy calibration condition, for example, a threshold or range of energy that is to be selectively provided by the controller. This energy provided may be controlled by an energy control module. The energy calibration condition may be an element of or alternative to the calibration condition.

The calibration operation 604 of the first clamp calibration element may affect the manner in which and/or the extent to which the recess changes the width, and, hence, the manner in which and/or the extent to which the first clamp engages the pivot member. The calibration of the first clamp may provide the first clamp with the ability to selectively engage the pivot member relative to at least one disk of the multi-disk pack of the hard disk drive, based on the modified force exerted.

In implementations, the second clamp may be substantially similar to the first clamp. There may be substantial reflective symmetry between the first clamp and the second clamp about a plane of mirror symmetry between the first clamp and the second clamp. Minor differences may exist, for example, with respect to the precision of the manufacturing and assembly steps associated with producing the brake crawler assembly. There may also be minor differences in how each of the first clamp and second clamp accommodates and interfaces with vertical actuators (including with different structures). However, the horizontal actuators and the elements that are coupled directly to them may possess substantial reflective symmetry about a plane between the horizontal actuators. As such, introducing operation 606 and calibrating operation 608 may be substantially equivalent to introducing operation 602 and calibration operation 604, respectively, except that they are applied to the second clamp. Further, any calibration conditions may be the same or different with respect to each clamp, and the adjustments to be made may be made similarly or differently. While the first and second clamp have been illustrated with the first clamp above the second clamp in vertical arrangement, either of a higher clamp or a lower clamp can be introduced and/or calibrated before the other. Further, a brake crawler with more than two clamps is contemplated, and any relative order of introduction and calibration of the different clamps is contemplated.

To facilitate vertical motion of the brake crawler assembly, the first clamp and the second clamp may include a shared coupled portion and may be otherwise uncoupled from one another. The coupled portion may be coincident with the horizontal recesses in which the first actuator and the second horizontal actuator. The portions of the brake crawler assembly other than the coupled portion where the first clamp and second clamp are coupled may rely on at least one vertical actuator to modify vertical distances between the first clamp and the second clamp. The at least one vertical actuator may each be coupled to both the first clamp and the second clamp. For example, the first clamp and the second clamp may share split vertical recesses with portions in each of the first clamp and the second clamp. These split vertical recesses may be positioned in portions of the brake crawler assembly where the first clamp and the second clamp are otherwise uncoupled. In implementations where the at least one vertical actuator is/are single units that expand and contract responsive to modification of introduced energy, the at least one vertical actuator may couple the first clamp and the second clamp at portions where the first clamp and the second clamp are otherwise uncoupled.

Introducing operation 610 introduces the at least one vertical actuator to at least one split vertical recess. The at least one vertical actuator may couple otherwise uncoupled portions of the first clamp and the second clamp. The at least one vertical actuator may include one or any other number of vertical actuators. The at least one vertical actuator may be used to modify a distance between and/or force between the first clamp and the second clamp at positions at which the at least one vertical actuator is coupled to the first clamp and the second clamp. Each of the at least one vertical actuator may be positioned in a split vertical recess, the split vertical recess having a first recessed portion in the first clamp and the split vertical recess having a second recessed portion in the second clamp. The split may represent a separation between the first clamp and the second clamp where they are not otherwise directly coupled.

In implementations, the internal distance modifier may be a flexure on which other elements of the vertical calibration element exert a force. At least a portion of the internal distance modifier may be coupled to the at least one vertical actuator and optionally with another portion of the at least one vertical actuator that at least partially opposes the internal distance modifier coupled to a portion of the split vertical recess. The internal distance modifier may be integral to and flexible relative to other portions of the split vertical recess.

Calibration operation 612 calibrates the at least one vertical actuator. Each of the at least one vertical actuator may have vertical calibration elements. The vertical calibration elements may each include a vertical calibration element access portion and an internal distance modifier. The at least one vertical actuator applies force to the split vertical recesses responsive to modification of energy introduced to the at least one vertical actuator causing modification of the distance between the first clamp and the second clamp at portions of the brake crawler assembly in which the first clamp and the second clamp are otherwise uncoupled (otherwise meaning other than any coupling established by the at least one vertical actuator, if any, between the first clamp and the second clamp).

The vertical calibration element access portion may be an element of the vertical calibration element that is accessible from outside of the brake crawler assembly. Modification of the vertical calibration element access portion may cause an internal distance modifier to modify one or more of a force applied by the at least one vertical actuator on the split vertical recess and/or to modify a vertical distance between the first clamp and second clamp when modifying energy provided to the at least one vertical actuator. The vertical calibration element can alternatively or additionally receive an external adjustment at the vertical calibration element access portion to adjust a force applied by the at least one vertical actuator on one or more of the split vertical recess, other portions of the split vertical recess, one or more of the first clamp and the second clamp, and the vertical calibration element. One or more of the distance and the force may be modified by the external adjustment to satisfy a vertical calibration condition, such as a vertical calibration condition.

The vertical calibration condition may include a threshold or range of distance between and/or a position of one or more of the first clamp, the second clamp, the at least one vertical actuator, positions in the recess, and an internal distance modifier. The calibration condition may include a force and/or distance threshold as appropriate. In an implementation, the calibration condition may additionally or alternatively include a force calibration condition based on the force exerted by the at least one vertical actuator on one or more of the at least a portion of the first clamp and the at least a portion of the second clamp. In an implementation, the vertical calibration condition includes a resting distance range between the first clamp and the second clamp when the at least one vertical actuator is at rest and includes an energized distance range between at least a portion of the first clamp and at least a portion of the second clamp when the at least one vertical actuator is provided a predefined quantity of energy. A distance or force calibration condition can be applied to one or more of the conformations and/or orders of operations (a)-(g) represented in progression 500. For example, the force can be measured when one of the clamps is engaged with the pivot member or when both are engaged with the pivot member. The distances can be measured in states when the at least one vertical actuator has expanded and/or contracted. The distance can include displacement of elements of the recess and/or internal distance modifiers (e.g., flexures). Calibration may also involve calibrating modifications to energy provided to the vertical actuators. For example, a controller in the hard drive may be calibrated to provide a predefined amount of energy to the vertical actuators that is established during calibration. The energy calibration may need to satisfy an energy calibration condition, for example, a threshold or range of energy that is to be selectively provided by the controller. This energy provided may be controlled by an energy control module. The energy calibration condition may be an element of or alternative to the calibration condition.

In implementations with more than one vertical actuator, the vertical calibration condition can include the strokes or distances of the more than one vertical actuator. For example, the stroke of the vertical actuators may be matched such that they extend a same vertical distance along the pivot member. Matching the strokes of the vertical actuators may be useful in preventing binding and prevent the system from actuating lopsided vertical motion.

In implementations, the one or more of the at least one vertical actuator and the first and second horizontal actuators, when installed, may block access to the other of them or their respective calibration elements, so the calibration of each may be conducted in an order such that introduction of an actuator does not prevent introduction or calibration of a different actuator. For example, if the at least one vertical actuator blocks access to the first clamp calibration access portion when the at least one vertical actuator is installed, the first horizontal actuator and the second horizontal actuator may be introduced and calibrated in operations 602, 604, 606, and 608, before the at least one vertical actuator is introduced and calibrated in operations 610 and 612. Implementations are contemplated in which conformations of the brake crawler assembly differ. In another implementation, the operations may be conducted in order of the introducing operation 602, the calibration operation 604, the introducing operation 610, the calibration operation 612, the introducing operation 606, and the calibration operation 608. In a different implementation, all of the introducing operations 602, 606, and 610 may be conducted before any of the calibration operations 604, 608, or 612.

Figure 7:
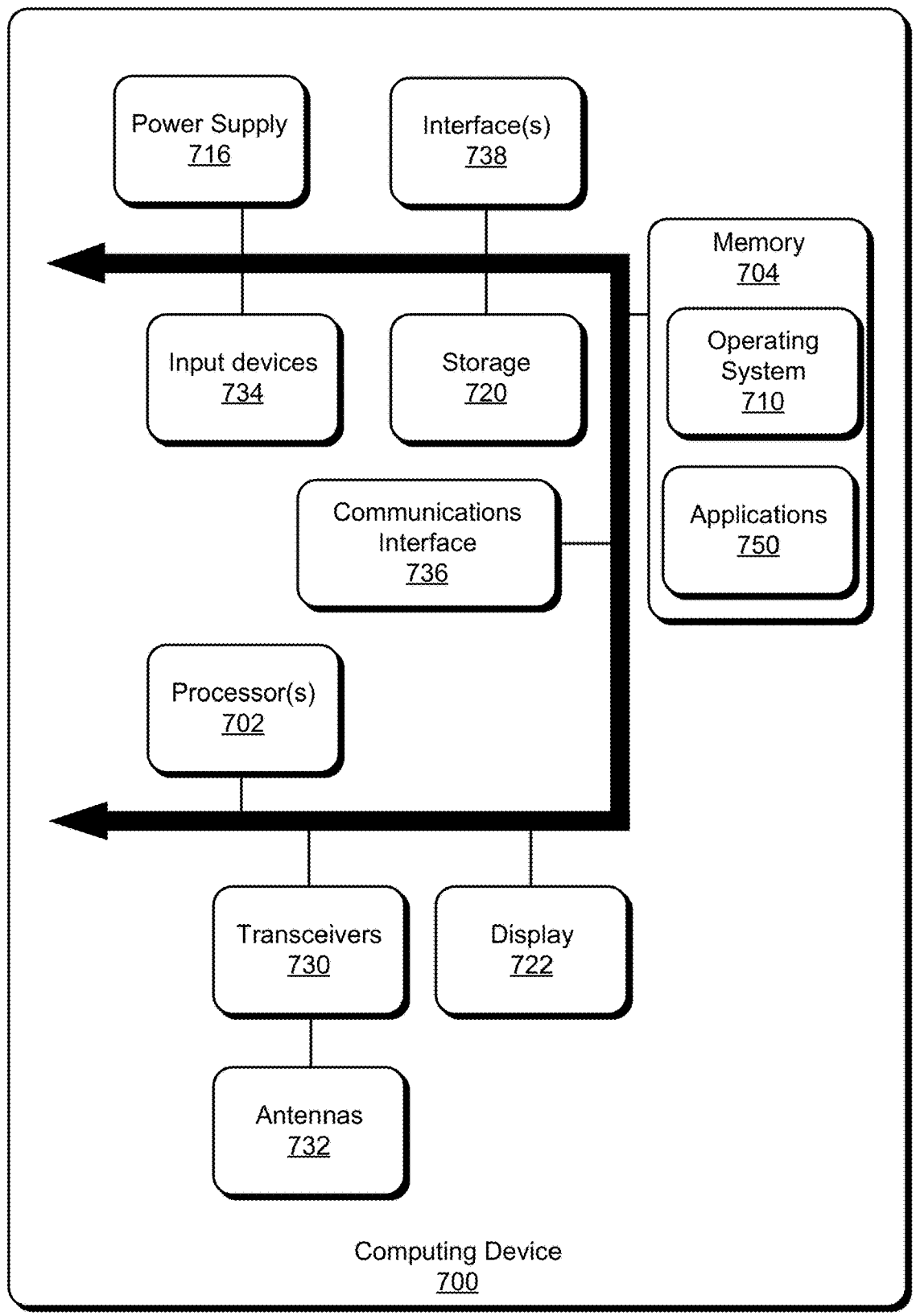
FIG. 7 illustrates an example computing device 700 for implementing the features and operations of the described technology.

FIG. 7 illustrates an example computing device 700 for implementing the features and operations of the described technology. The computing device 700 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 700 includes one or more processor(s) 702 and a memory 704. The memory 704 generally includes both volatile memory (e.g., RAM) and nonvolatile memory (e.g., flash memory). An operating system 710 resides in the memory 704 and is executed by the processor(s) 702.

In an example computing device 700, as shown in FIG. 7, one or more modules or segments, such as applications 750, locomotion modules, calibration modules, and energy control modules are loaded into the operating system 710 on the memory 704 and/or storage 720 and executed by processor(s) 702. The storage 720 may be an element of a calibrating computer device 700 or may be the multi-disk hard disk system of which the brake crawler assembly system is an element. The storage 720 may include one or more tangible storage media devices and may store calibration conditions, energy calibration conditions, grip conditions, vertical calibration conditions, force calibration conditions, thresholds, ranges, globally unique identifiers, requests, responses, and other data and be local to the computing device 700 or may be remote and communicatively connected to the computing device 700.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a network adapter 736, which is a type of computing device. The computing device 700 may use the adapter and any other types of computing devices for establishing connections over a wide-area network (WAN) or local-area network (LAN). It should be appreciated that the network connections shown are examples and that other computing devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing device 700 may further include a display 722, such as a touch screen display.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A brake crawler assembly configured for vertically moving an arm assembly along a pivot member in a multi-disk hard disk drive, comprising:
    a first clamp including:
        a first recess within which is disposed a first actuator;
        a first clamp calibration element including:
            a first clamp calibration access portion adapted to be accessible externally of the first clamp and adapted to receive a first external adjustment; and
            a first clamp internal compression modifier adapted to modify a force exerted by the first actuator on the first recess, responsive to the received first external adjustment,
        wherein the first clamp is configured to selectively engage the pivot member at a position along the pivot member relative to at least one disk of the multi-disk hard disk drive based on the modified force exerted.

2. The brake crawler assembly of claim 1, wherein the first actuator is adapted to receive energy and modify a width of the first recess responsive to the received energy, based on the first external adjustment.

3. The brake crawler assembly of claim 2, wherein the first clamp is adapted to disengage from the pivot member responsive to the modification of the width of the first recess, based on the first external adjustment.

4. The brake crawler assembly of claim 2, wherein the pivot member is adapted to rotate about an axis of rotation within the multi-disk hard disk drive and wherein the modification of the width is in a direction substantially orthogonal to the axis of rotation.

5. The brake crawler assembly of claim 1, wherein the first clamp is adapted to engage the pivot member responsive to relaxation of the first actuator, based on the first external adjustment.

6. The brake crawler assembly of claim 1, wherein the first clamp internal compression modifier includes a first flexure integral to and flexible relative to other elements of the first clamp.

7. The brake crawler assembly of claim 6, the first clamp further comprising a first opposing flexure in the first recess, the first opposing flexure flexible relative to the first flexure and the other elements of the first clamp, the first actuator coupled on at least partially opposing ends to the first flexure and the first opposing flexure.

8. The brake crawler assembly of claim 1, wherein the modified force exerted by the first actuator satisfies a calibration condition.

9. The brake crawler assembly of claim 8, wherein the first clamp comprises:
    at least one clamp engagement element, wherein the first clamp is adapted to engage with the pivot member at the at least one clamp engagement element and the calibration condition includes a gripping condition representing a threshold force of engagement between the at least one clamp engagement element and the pivot member.

10. The brake crawler assembly of claim 1, further comprising
    a second clamp positioned below the first clamp, the second clamp comprising:
        a second recess within which is disposed a second actuator;
        a second clamp calibration element including:
            a second clamp calibration access portion adapted to be accessible externally of the second clamp and adapted to receive a second external adjustment;
            a second clamp internal compression modifier adapted to modify a force exerted by the second actuator on the second recess, responsive to the received second external adjustment; and
    a vertical actuator coupled to and disposed between the first clamp and the second clamp.

11. The brake crawler assembly of claim 10, further comprising
    a vertical calibration element including:
        a vertical calibration element access portion adapted to be accessible externally of the first clamp and the second clamp and adapted to receive a third external adjustment; and
        an internal distance modifier adapted to modify a distance between the first clamp and the second clamp responsive to the received third external adjustment, wherein the vertical actuator is configured to selectively modify the position of at least a portion of the first clamp relative to at least a portion of the second clamp along the pivot member.

12. The brake crawler assembly of claim 11, wherein the distance is modified to satisfy a vertical calibration condition based on the distance between the at least a portion of the first clamp and the at least a portion of the second clamp.

13. The brake crawler assembly of claim 12, wherein the vertical calibration condition includes a resting distance range between the first clamp and the second clamp when the vertical actuator is at rest and includes an energized distance range between the at least a portion of the first clamp and the at least a portion of the second clamp when the vertical actuator is provided a predefined quantity of energy.

14. The brake crawler assembly of claim 12, wherein the distance is modified to satisfy a force calibration condition based on the force exerted by the vertical actuator on one or more of the at least a portion of the first clamp and the at least a portion of the second clamp.

15. A method of calibrating a brake crawler system configured for vertically moving an arm assembly along a pivot member in a multi-disk hard disk drive, comprising
    introducing a first actuator to a first recess of a first clamp, the first clamp further including a first clamp calibration element, the first clamp calibration element including a first clamp calibration access portion adapted to be accessible externally of the first clamp and the first clamp calibration element including a first clamp internal compression modifier adapted to modify a force exerted by the first actuator on the first recess responsive to external adjustments to the first clamp calibration access portion; and calibrating an engagement of the first clamp with the pivot member, the calibrating the engagement of the first clamp including:

positioning clamp engagement elements of the first clamp relative to pivot engagement elements of the pivot member;

modifying energy provided to the first actuator; and providing a first external adjustment to the first clamp calibration access portion, the first external adjustment modifying the force exerted by the first actuator on the first recess, responsive to the modification of energy provided to the first actuator.

16. The method of claim 15, wherein the first external adjustment includes modifying the force exerted by the first actuator to cause the clamp engagement elements of the first clamp to engage the pivot engagement elements to satisfy a calibration condition.

17. The method of claim 15, further comprising:

introducing a second actuator to a second recess of a second clamp, the second clamp further including a second calibration element, the second calibration element including a second clamp calibration access portion adapted to be accessible externally of the second clamp and the second calibration element including a second clamp internal compression modifier adapted to modify a force exerted by the second actuator on the second recess responsive to external adjustments to the second clamp calibration access portion; and calibrating the engagement of the second clamp with the pivot member, the operation of calibrating the engagement of the second clamp including:

positioning clamp engagement elements of the second clamp relative to the pivot engagement elements of the pivot member;

modifying energy provided to the second actuator; and providing a second external adjustment to the second clamp calibration access portion, the second external adjustment modifying the force exerted by the second actuator on the second recess, responsive to the modification of the energy provided to the second actuator.

18. The method of claim 17, further comprising:

introducing a vertical actuator to a split vertical recess, the split vertical recess including recesses in each of the first clamp and the second clamp, the vertical actuator introduced to conform to a vertical calibration element, the vertical calibration element including a vertical calibration element access portion accessible externally of the brake crawler system and the vertical calibration element including an internal distance modifier disposed in the split vertical recess;

calibrating an effect of modifying energy the vertical actuator on a position of the first clamp relative to the second clamp, the operation of calibrating the effect including:

modifying energy provided to the first actuator to cause the first clamp to engage the pivot member;

modifying energy provided to the second actuator to cause the second clamp to disengage from the pivot member;

modifying the energy provided to the vertical actuator, responsive to the operation of modifying energy provided to the first actuator and the operation of modifying energy to the second actuator, to cause the vertical actuator to modify a vertical distance between at least a portion of the first clamp and at least a portion of the second clamp; and providing a third external adjustment to the vertical calibration element, the third external adjustment modifying a distance between the at least a portion of the first clamp and the at least a portion of the second clamp.

19. The method of claim 18, wherein the third external adjustment satisfies a vertical calibration condition based on a distance between the at least a portion of the first clamp and the at least a portion of the second clamp.

20. The method of claim 18, wherein the distance is modified to satisfy a force calibration condition based on a force exerted by the vertical actuator on one or more of the at least a portion of the first clamp and the at least a portion of the second clamp.

* * * * *